United States Patent
Kim et al.

(10) Patent No.: US 10,174,976 B2
(45) Date of Patent: Jan. 8, 2019

(54) HEAT EXCHANGER

(71) Applicants: Hyundai Motor Company, Seoul (KR); Doowon Climate Control Co., Ltd., Ansan-si (KR)

(72) Inventors: Jae Yeon Kim, Hwaseong-si (KR); Sang Ho Lee, Daejeon (KR); Soon-Jong Lee, Asan-si (KR)

(73) Assignees: Hyundai Motor Company, Seoul (KR); Doowon Climate Control Co., Ltd., Asan-si (KR)

( * ) Notice: Subject to any disclaimer, the term of this patent is extended or adjusted under 35 U.S.C. 154(b) by 315 days.

(21) Appl. No.: 14/933,991

(22) Filed: Nov. 5, 2015

(65) Prior Publication Data

US 2016/0327318 A1    Nov. 10, 2016

(30) Foreign Application Priority Data

May 6, 2015    (KR) .......................... 10-2015-0063347

(51) Int. Cl.
*F25B 40/00*    (2006.01)
*F28D 9/00*    (2006.01)
(Continued)

(52) U.S. Cl.
CPC .......... *F25B 40/00* (2013.01); *B60H 1/3227* (2013.01); *F28D 9/005* (2013.01); *F28D 9/0037* (2013.01);
(Continued)

(58) Field of Classification Search
CPC .......... F25B 40/00–40/06; F25B 41/06; F25B 41/067; F28D 9/0037; F28D 9/005; F28D 9/0093
See application file for complete search history.

(56) References Cited

U.S. PATENT DOCUMENTS 6,327,868 B1 *  12/2001  Furuya .................... F25B 31/00
                                                            62/129
2010/0243200 A1 *  9/2010  Baker, Jr. ........... B60H 1/00342
                                                            165/41
(Continued)

FOREIGN PATENT DOCUMENTS

DE    10 2006 026 629 A1    12/2007
DE    10 2012 113 111 A1    12/2013
(Continued)

*Primary Examiner* — Jianying Atkisson
*Assistant Examiner* — Antonio R Febles
(74) *Attorney, Agent, or Firm* — Morgan, Lewis & Bockius LLP

(57) ABSTRACT

A heat exchanger may include a heat radiating part, in which a plurality of plates is stacked and a plurality of first flow paths and a plurality of second flow paths disposed while crossing each other are formed inside the plurality of plates, the heat exchanging part being configured to mutually heat-exchange working fluids passing through the first and second flow paths, respectively, and a sub-expansion part integrally formed with an inner side of the heat radiating part, connected with the second flow path, and configured to bypass a part of one working fluid among the working fluids flowing into the heat radiating part and heat-exchange the bypassed working fluid with the working fluid passing through the first flow path.

7 Claims, 7 Drawing Sheets

(51) Int. Cl.
  *F28F 3/08*      (2006.01)
  *F28F 9/02*      (2006.01)
  *B60H 1/32*      (2006.01)
  *F28F 27/02*     (2006.01)
  *F28D 21/00*     (2006.01)
  *F25B 41/06*     (2006.01)

(52) U.S. Cl.
  CPC .............. *F28D 9/0093* (2013.01); *F28F 3/08* (2013.01); *F28F 9/0253* (2013.01); *F28F 27/02* (2013.01); *F25B 41/06* (2013.01); *F25B 2500/18* (2013.01); *F28D 2021/008* (2013.01); *F28D 2021/0068* (2013.01); *F28F 2250/06* (2013.01); *F28F 2280/06* (2013.01)

(56) References Cited

U.S. PATENT DOCUMENTS

| | | | |
|---|---|---|---|
| 2013/0192291 A1 | 8/2013 | Ito et al. | |
| 2013/0327287 A1* | 12/2013 | Kim | F01P 7/16 123/41.33 |
| 2014/0246173 A1 | 9/2014 | Cheadle et al. | |

FOREIGN PATENT DOCUMENTS

| | | |
|---|---|---|
| JP | 06-331223 A | 11/1994 |
| JP | 10-300384 A | 11/1998 |
| JP | H 10-325646 A | 12/1998 |
| JP | 2000-179990 A | 6/2000 |
| JP | 2001-280888 A | 10/2001 |
| JP | 2010-249499 A | 11/2010 |
| KR | 10-2010-0032198 A | 3/2010 |
| KR | 10-2012-0020425 A | 3/2012 |

\* cited by examiner

<S1>

<S2>

- - - - - - High temperature and high pressure liquid coolant
- - - - - - Low temperature and low pressure mixed coolant
———— Low temperature and low pressure gas coolant

HEAT EXCHANGER

CROSS-REFERENCE TO RELATED APPLICATION

The present application claims priority to Korean Patent Application No. 10-2015-0063347 filed May 6, 2015, the entire contents of which is incorporated herein for all purposes by this reference.

BACKGROUND OF THE INVENTION

Field of the Invention

The present invention relates to a heat exchanger, and more particularly, to a heat exchanger which heat-exchanges working fluids having different temperatures.

Description of Related Art

In general, an air conditioning system of a vehicle maintains a temperature inside the vehicle at an appropriate temperature regardless of a change of an outside temperature and maintains a pleasant indoor environment.

The air conditioning system includes a compressor compressing a coolant, a condenser condensing the coolant compressed by the compressor, an expansion valve rapidly expanding the coolant condensed by the condenser and liquefied, and an evaporator cooling air blown inside a vehicle in which the air conditioning system is installed, by using evaporative latent heat of the coolant while evaporating the coolant expanded by the expansion valve, as main constituent elements.

The air conditioning system is operated according to a general cooling cycle, and the coolant is continuously phase-changed from a high temperature and high pressure liquid state to a low temperature and low pressure gas state while sequentially and repeatedly circulating through the constituent elements, so that a cooling process is performed.

Here, the high temperature and high pressure liquid coolant is mutually heat-exchanged with the low temperature and low pressure gas coolant through the heat exchanger having a dual pipe structure installed in an air conditioner pipe, so that the coolant is supercooled.

However, the air conditioning system for a vehicle in the related art has a structure in which the heat exchanger supercools the coolant condensed by the condenser again, so that a coolant flow is complex, and thus there is a problem in that a pressure drop inside inlet and outlet pipes of the condenser is frequently incurred.

Further, the condenser has a limited size, and an internal space of an engine room is narrow and small and thus a length of the pipe of the air conditioner through which the coolant moves is limited, so that a minimum required length for reducing a temperature of the coolant to a required temperature is not satisfied, and thus a coefficient of performance (COP) that is a coefficient of cooling performance compared to consumed power of the compressor is decreased, thereby degrading entire cooling performance and efficiency of the air conditioning system.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a heat exchanger which bypasses and expands a part of an inflow high temperature and high pressure liquid coolant, heat-exchanges a low temperature and low pressure gas coolant with the high temperature and high pressure liquid coolant, and cools the high temperature and high pressure liquid coolant, thereby improving cooling performance of an air conditioning system by improving subcooling of the coolant.

According to various aspects of the present invention, a heat exchanger may include a heat radiating part, in which a plurality of plates is stacked and a plurality of first flow paths and a plurality of second flow paths disposed while crossing each other are formed inside the plurality of plates, the heat exchanging part being configured to mutually heat-exchange working fluids passing through the first and second flow paths, respectively, and a sub-expansion part integrally formed with an inner side of the heat radiating part, connected with the second flow path, and configured to bypass a part of one working fluid among the working fluids flowing into the heat radiating part and heat-exchange the bypassed working fluid with the working fluid passing through the first flow path.

The sub-expansion part may include at least one third flow path connected with one second flow path among the second flow paths through a connection hole, and an orifice configured to expand a working fluid flowing into the third flow path.

The working fluid may include a high temperature and high pressure liquid coolant supplied from a condenser and partially passing through the third flow path while passing through the first flow path, and a low temperature and low pressure gas coolant supplied from an evaporator and passing through the second flow path.

The heat radiating part may include a first inflow hole formed at a first side of a first surface of the heat radiating part and connected with the first flow path, a first exhaust hole formed at a second side of the first surface of the heat radiating part and connected with the first flow path, a second inflow hole formed at a first side of a second surface of the heat radiating part and connected with the second flow path, and a second exhaust hole formed at a second side of the second surface of the heat radiating part and connected with the second flow path.

A connection block may be mounted on one surface of the heat radiating part.

The connection block may include a first connection hole formed at a first side of the connection block corresponding to the first inflow hole, and connected to the first inflow hole through a connection passage formed inside the connection block, and a second connection hole formed at a second side of the connection block corresponding to the second exhaust hole and connected with the second exhaust hole.

The first connection hole may be connected with the third flow path through the orifice.

A lower cover may be mounted on the second surface of the heat radiating part, and connection ports may be integrally formed in the lower cover at locations corresponding to the first exhaust hole and the second inflow hole, respectively.

The third flow path may be disposed between the first flow paths at a location close to the first inflow hole.

The heat radiating part may be integrally mounted in the expansion valve.

The heat radiating part may make the working fluids passing through the first flow paths and the second flow paths counter-flow and mutually heat-exchanges the working fluids.

The heat radiating part may be formed in a plate shape, in which a plurality of plates is stacked.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
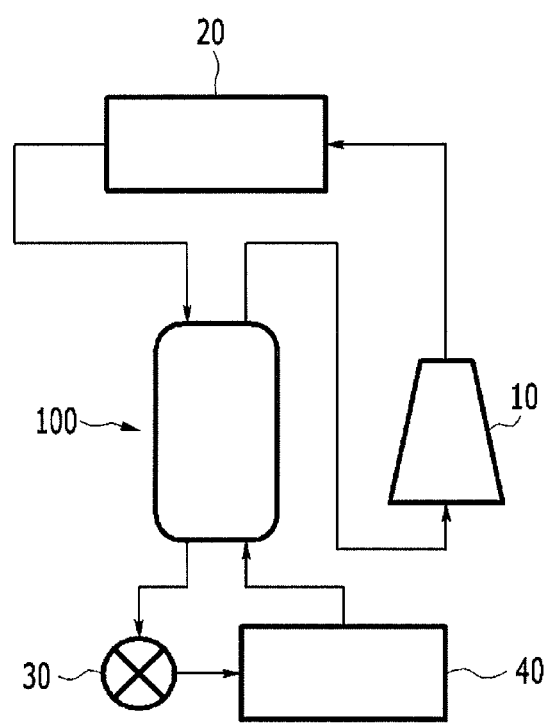
FIG. 1 is a block configuration diagram of an air conditioning system to which an exemplary heat exchanger according to the present invention is applied.
Figure 2:
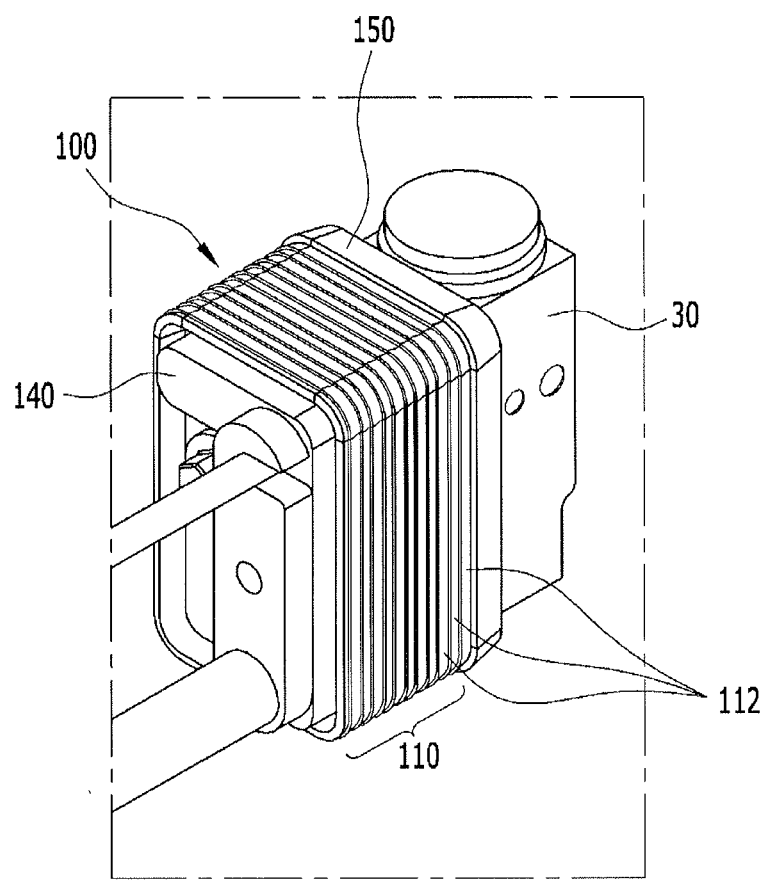
FIG. 2 is a perspective view of the exemplary heat exchanger according to the present invention.
Figure 3A:
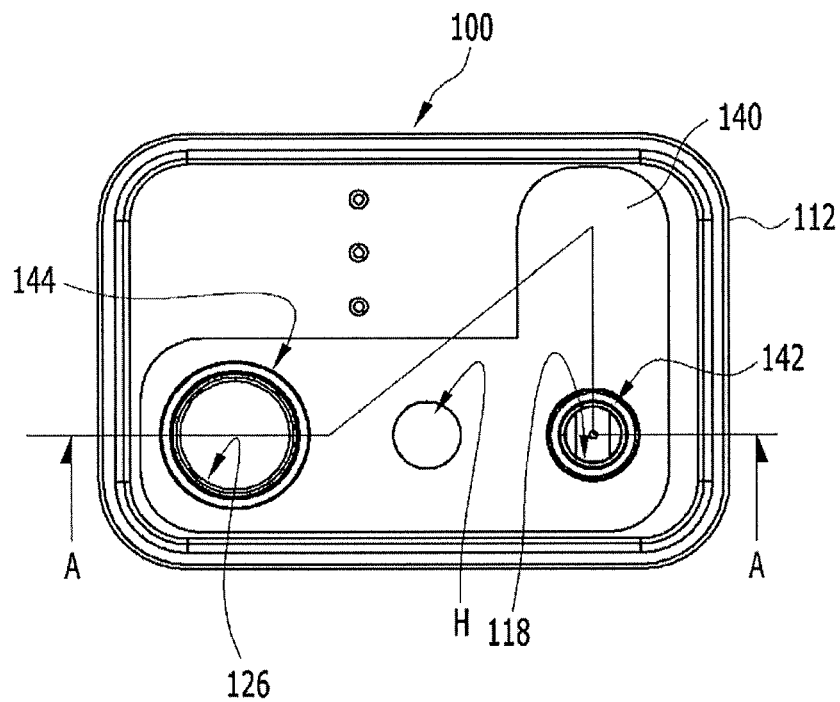
FIG. 3A and FIG. 3B are top plan views of the exemplary heat exchanger according to the present invention.
Figure 3B:
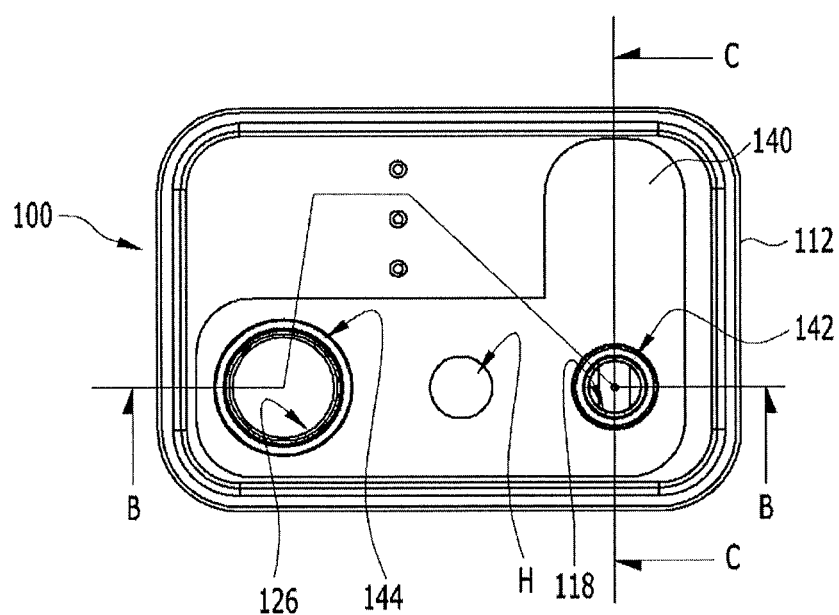
Figure 4:
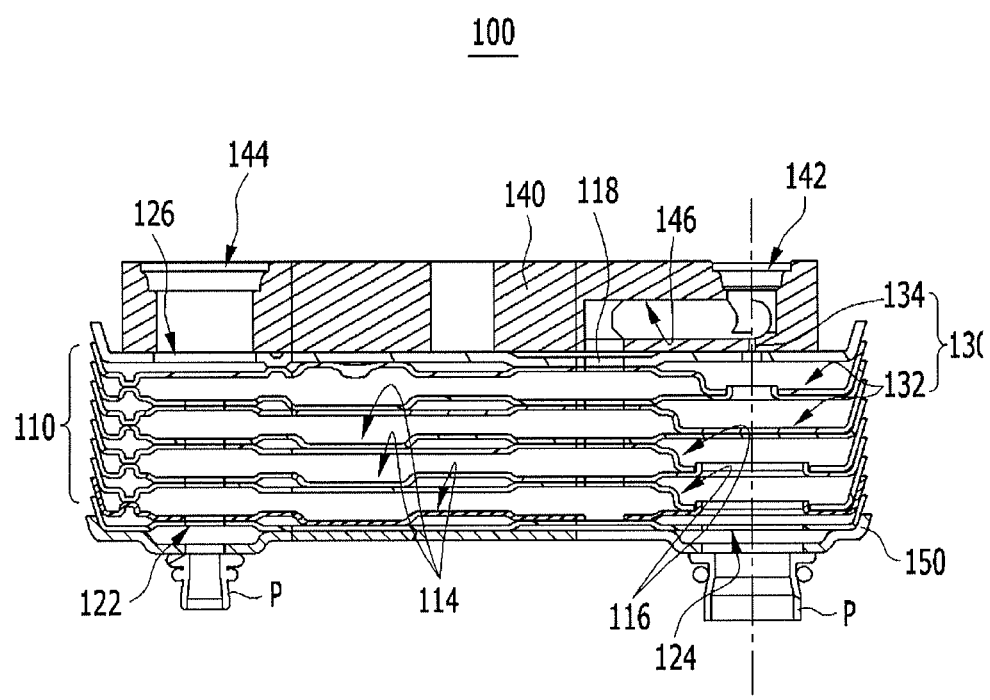
FIG. 4 is a cross-sectional view taken along line A-A of FIG. 3A.
Figure 5:
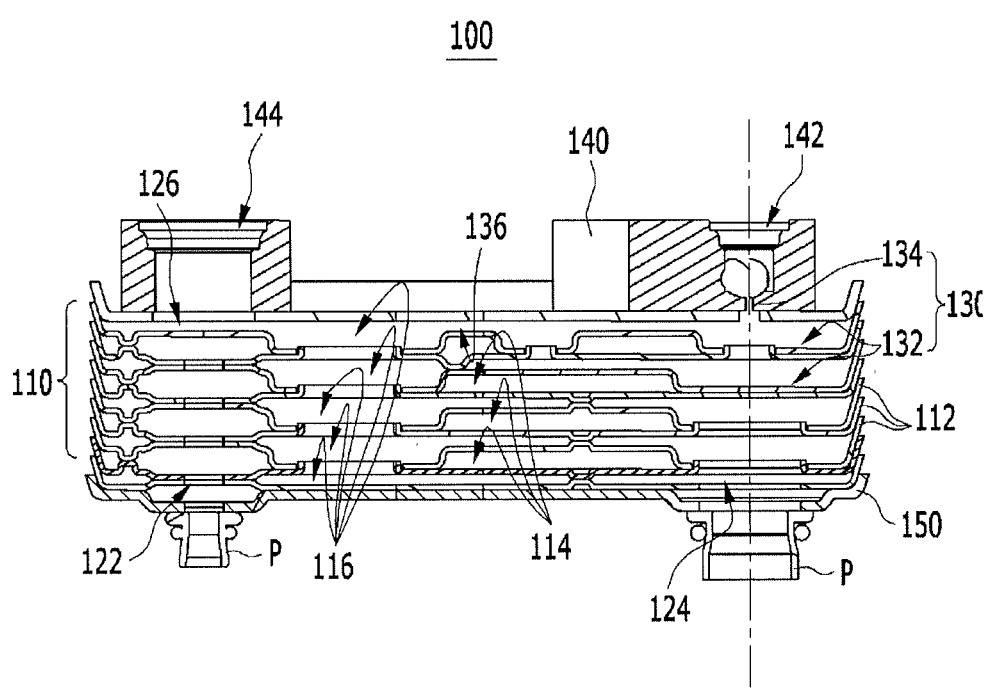
FIG. 5 is a cross-sectional view taken along line B-B of FIG. 3B.
Figure 6:
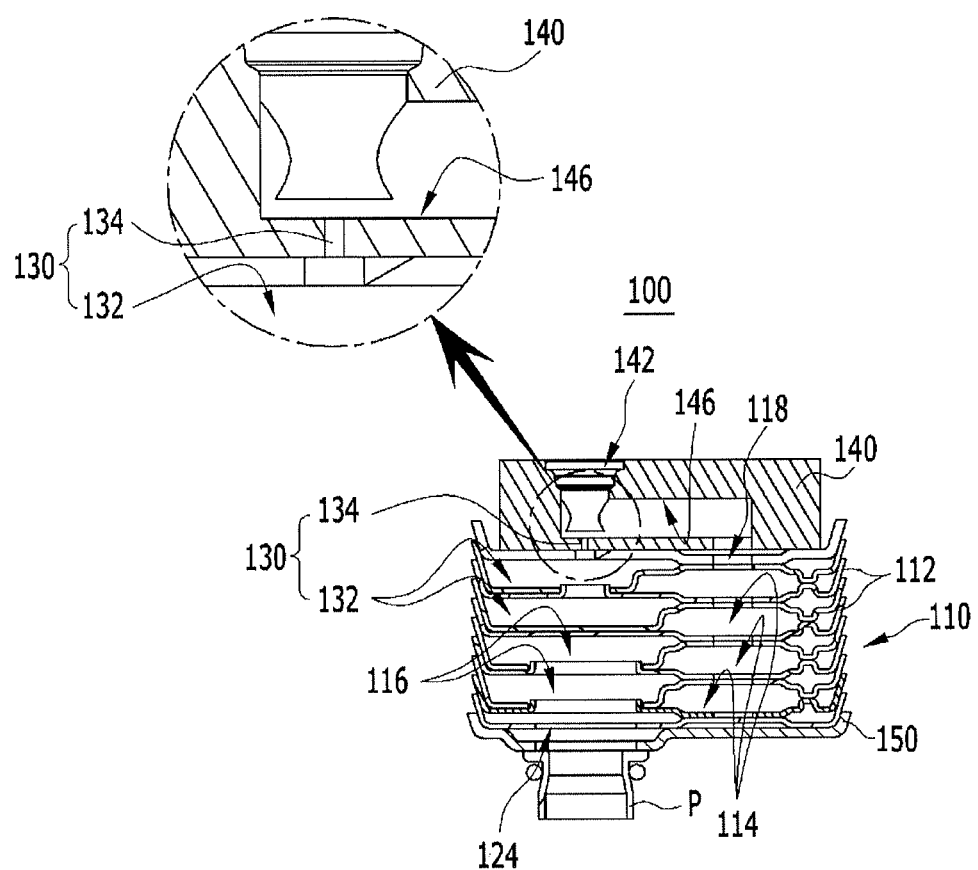
FIG. 6 is a cross-sectional view taken along line C-C of FIG. 3B.

FIG. 1 is a block configuration diagram of an air conditioning system, to which a heat exchanger according to an exemplary embodiment of the present invention is applied, FIGS. 2, 3A and 3B are a perspective view and top plan views of the heat exchanger according various embodiments of the present invention, FIG. 4 is a cross-sectional view taken along line A-A of FIG. 3A, FIG. 5 is a cross-sectional view taken along line B-B of FIG. 3B, and FIG. 6 is a cross-sectional view taken along line C-C of FIG. 3B.

Referring to FIG. 1, a heat exchanger 100 according to various embodiments of the present invention is applied to an air conditioning system including a compressor 10 compressing a coolant, a condenser 20 condensing the coolant, an expansion valve 30 expanding the condensed coolant, and an evaporator 40 evaporating the coolant expanded by the expansion valve 30.

In the air conditioning system configured as described above, the compressor 10, the condenser 20, the expansion valve 30, the evaporator 40, and the heat exchanger 100 are mutually connected through a connection pipe.

That is, in the various embodiments, the heat exchanger 100 is disposed between the condenser 20 and the expansion valve, and between the evaporator 40 and the compressor 10. The coolant discharged from the condenser 20 and the coolant discharged from the evaporator 40 flow into the heat exchanger 100.

The heat exchanger 100 includes a heat radiating part 110 and a sub-expansion part 130 as illustrated in FIGS. 2 to 6.

First, the heat radiating part 110 will be described with reference to FIGS. 4 to 6 that are cross-sectional views taken along lines A-A, B-B, and C-C illustrated in FIGS. 3A and 3B.

In the present exemplary embodiment, as illustrated in FIGS. 4 to 6, in the heat radiating part 110, a plurality of plates 112 is stacked and a plurality of first flow paths 114 and a plurality of second flow paths 116 are disposed inside the plurality of plates 112 while crossing each other, and the heat radiating part 110 mutually heat-exchanges operating fluids passing through the first and second flow paths 114 and 116.

The heat radiating part 110 configured as described above may be formed in a plate form, in which the plurality of plates 112 is stacked.

The heat radiating part 110 is provided with a first inflow hole 118, a first exhaust hole 122, a second inflow hole 124, and a second exhaust hole 126.

The first inflow hole 118 is formed at one side of one surface of the heat radiating part 110, and is connected with the first flow paths 114.

The first exhaust hole 122 is formed at the other side of one surface of the heat radiating part 110, and is connected to the first inflow hole 118 through the first flow paths 116.

The second inflow hole 124 is formed at one side of the other surface of the heat radiating part 110, and is connected with the second flow paths 116. The second inflow hole 124 is positioned in an opposite direction to the first inflow hole 118 formed on one surface of the heat radiating part 110.

Further, the second exhaust hole 126 is formed at the other side of the other surface of the heat radiating part 110, and is connected with the second inflow hole 124 through the second flow paths 116. The second exhaust hole 126 is positioned in an opposite direction to the first exhaust hole 122 formed on the other surface of the heat radiating part 110.

In the meantime, in the various embodiments, it is described that the first and second inflow holes 118 and 124 and the first and second exhaust holes 122 and 126 are formed on one surface and the other surface of the heat radiating part 110, respectively, as one exemplary embodiment, but the present invention is not limited thereto, and the locations of the first and second inflow holes 118 and 124 and the first and second exhaust holes 122 and 126 may be changed to be applied.

For example, all of the first and second inflow holes 118 and 124 and the first and second exhaust holes 122 and 126 may be formed on any one surface between both surfaces of the heat radiating part 110.

Accordingly, the heat radiating part 110 may make a flow of the working fluids passing through the first and second flow paths 114 and 116 through the first and second inflow holes 118 and 124 counter-flow and heat-exchange the working fluids.

In the various embodiments, the sub-expansion part 130 is integrally formed inside the heat radiating part 110 to be connected with the second flow paths 116. The sub-expansion part 130 bypasses and expands a part of one working fluid among the working fluids flowing into the heat radiating part 110, and heat-exchanges the expanded working fluid with the working fluid passing through the first flow paths 114.

Here, the sub-expansion part 130 may include at least one third flow path 132 and one orifice 134.

First, the third flow path 132 is connected to one second flow path 116 among the second flow paths 116 through a connection hole 136 inside the heat radiating part 110. The third flow paths 132 may be formed in two columns inside the heat radiating part 110.

Here, the third flow paths 132 may be disposed at both upper and lower sides of the first flow path 114 positioned at an upper side based on FIGS. 3A and 3B at a location close to the first inflow hole 118, respectively.

That is, the third flow paths 132 are formed at one side of an internal side of the heat radiating part 110 with the first flow path 114 interposed therebetween. The third flow path 132 heat-exchanges the working fluid flowing into the third flow path 132 with the working fluid passing through the first flow path 114.

Accordingly, the working fluid passing through the third flow path 132 is heat-exchanged with the working fluid passing through the first flow path 114 disposed between the third flow paths 132. Then, the working fluid of the third flow path 132 is mixed with the working fluid passing through the second flow path 118 through the connection hole 136, and is discharged to the outside of the heat radiating part 110 through the second exhaust hole 126.

Then, the orifice 134 expands a part of the working fluid flowing into the third flow path in the working fluid flowing into the first inflow hole 118.

The orifice 134 is a passage which changes a diameter of a passage to be narrow and controls a flow of the working fluid, and changes a pressure through adiabatic expansion while the working fluid passes therethrough. That is, when a part of the working fluid flowing into the first inflow hole 118 flows into the orifice 134, the orifice 134 expands the part of the working fluid by using a pressure change and phase-changes the working fluid.

Accordingly, the working fluid may be adiabatically expanded while passing through the orifice 134 to be phase-changed.

A definition and a function of the orifice 134 are apparent to those skilled in the art, so that a more detailed description thereof will be omitted.

In the meantime, in various embodiments, the working fluid may be formed of a high temperature and high pressure liquid coolant, which is supplied from the condenser 20 and of which a part passes through the third flow path 136 while passing through the first flow path 114, and a low temperature and low pressure gas coolant, which is supplied from the evaporator 40 and passes through the second flow path 116.

That is, the working fluid flowing into the third flow path 132 is formed of a high temperature and high pressure liquid coolant, is expanded while passing through the orifice 134, and is phase-changed to a low temperature and low pressure mixed coolant, in which gas and a liquid are mixed, to pass through the third flow path 132.

In the meantime, in the present exemplary embodiment, a connection block 140 may be mounted on one surface of the heat radiating part 110.

The connection block 140 may be provided with first and second connection holes 142 and 144 formed at one side and the other side thereof, respectively.

First, the first connection hole 142 is formed at one side corresponding to the first inflow hole 118, and is connected with the first inflow hole 118 through a connection passage 146 formed therein.

Here, the first connection hole 142 may be connected with the third flow path 132 through the orifice 134. Accordingly, the coolant flowing from the condenser 20 flows into the connection hole 142, and a part of the coolant flows into the third flow path 132 through the orifice 134.

In the various embodiments, the second connection hole 144 is formed at the other side corresponding to the second exhaust hole 126, and is connected with the second exhaust hole 126.

Further, a through-hole H is formed while passing through the heat radiating part 110 between the first connection hole 142 and the second connection hole 144. A fastening bolt may be inserted into the through-hole H when the heat exchanger 100 is mounted.

The connection block 144 configured as described above may effectively connect pipes which are connected to the compressor 10 and the condenser 20, respectively, to the heat radiating part 110.

In the meantime, a lower cover 150 may be mounted on the other surface of the heat radiating part 110.

Connection ports P may be integrally formed with the lower cover 150 at locations corresponding to the first exhaust hole 122 and the second inflow hole 124, respectively. Accordingly, the heat radiating part 110 may be integrally mounted with the expansion valve 30 through the connection ports P of the lower cover 150.

Hereinafter, an operation and an action of the heat exchanger 100 according to various embodiments of the present invention will be described in detail.

Figure 7:
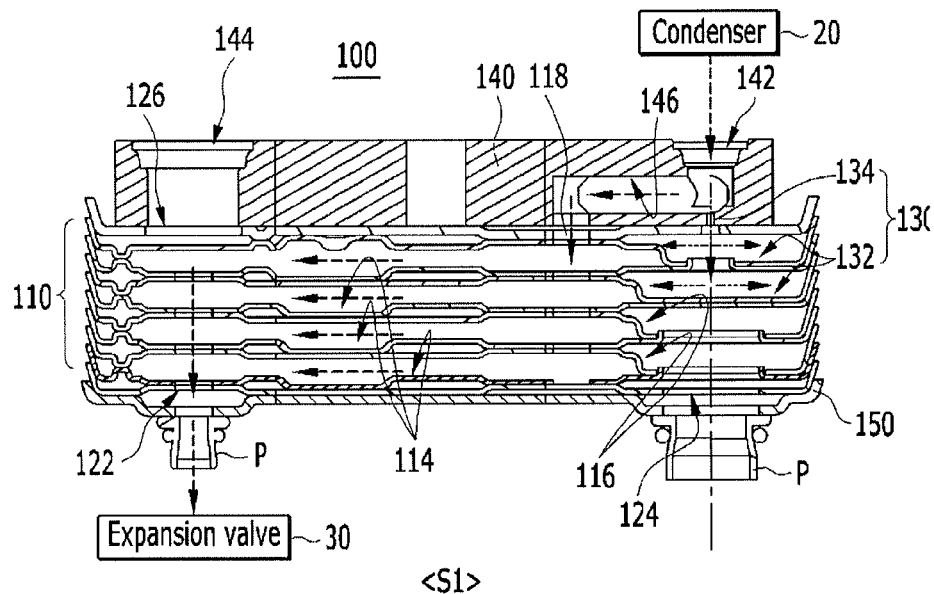
FIG. 7 is an operation state diagram of the exemplary heat exchanger according to the present invention.
Figure 7:
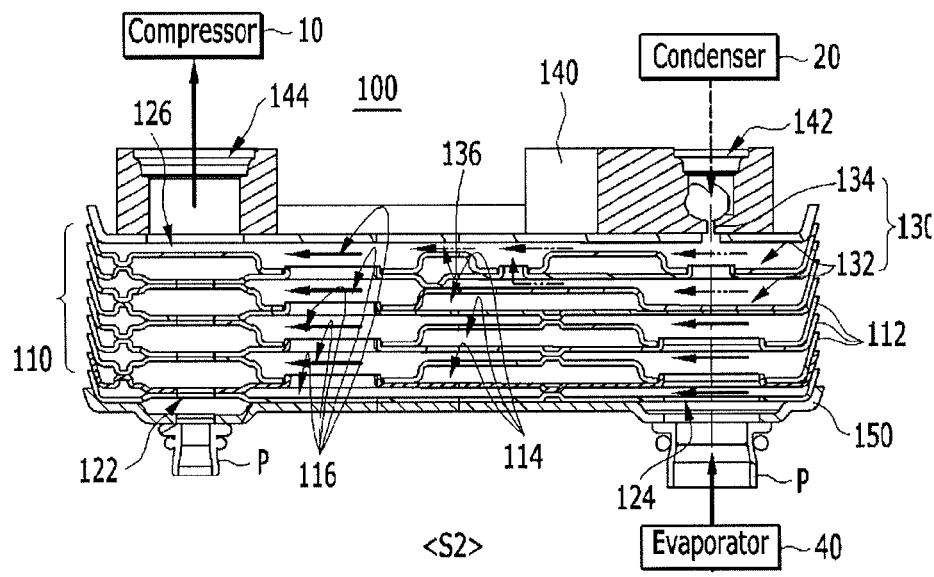

FIG. 7 is an operation state diagram of the heat exchanger according to the various embodiments of the present invention.

First, as illustrated in S1 of FIG. 7, the high pressure and high pressure liquid coolant discharged from the condenser 20 flows into the first connection hole 142 of the connection block 140, passes through the connection passage 146 and the first inflow hole 118, and flows into the first flow paths 114 of the heat radiating part 110.

In this case, the sub-expansion part 130 makes a part of the high temperature and high pressure liquid coolant flowing into the first connection hole 118 pass through the orifice 134 and flow into the third flow path 132. The high temperature and high pressure liquid coolant is expanded through the orifice 134 and phase-changed to a low temperature and low pressure mixed coolant.

Accordingly, the working fluid passing through the third flow path 132 is formed of the low temperature and low pressure mixed coolant, in which a gas coolant and a liquid coolant are mixed.

The mixed coolant may be mutually heat-exchanged with the liquid coolant passing through the first flow path 114 and flow into the second flow path 116 through the connection hole 136.

In the meantime, the liquid coolant passing through the first flow path 114 is mutually heat-exchanged with the mixed coolant and a low temperature and low coolant gas coolant to be described below inside the heat radiating part 110, and then is discharged to the outside of the heat radiating part 110 through the first exhaust hole 122.

As described above, the coolant discharged through the first exhaust hole 122 flows into the expansion valve 30.

Then, as illustrated in S2 of FIG. 7, the low temperature and low pressure gas coolant discharged from the evaporator 40 flows into the second inflow hole 124 of the heat radiating part 110 and passes through the second flow path 116.

Accordingly, the liquid coolant passing through the first flow path 114 is mutually heat-exchanged with the low temperature and low pressure gas coolant passing through the second flow path 116 and the low temperature and low pressure mixed coolant passing through the third flow path 132 to be cooled.

Here, the liquid coolant passing through the first flow path 114 may be efficiently heat-exchanged while flowing in an opposite direction to that of the gas coolant and the mixed coolant passing through the second flow path 116 and the third flow path 132.

Further, the heat exchanger 100 according to various embodiments may bypass a part of the liquid coolant flowing from the condenser 20 through the sub-expansion part 130, expand the bypassed coolant, and phase-change the expanded coolant to the low temperature and low pressure mixed coolant, and then use the phase-changed mixed coolant for the heat-exchange with the liquid coolant.

Accordingly, the heat exchanger 100 maintains an entire flow rate of the flowing coolant, and reduces a temperature of the coolant flowing into the evaporator 40 through the expansion valve 30 and a temperature of the coolant flowing into the compressor 10.

Accordingly, when the heat exchanger 100 according to various embodiments of the present invention configured as described above is applied, the plurality of plates 112 are stacked, and a part of the high temperature and high pressure flowing liquid coolant is bypassed and expanded, the high temperature and high pressure coolant is mutually heat-exchanged with the low temperature and low pressure gas coolant and cooled, so that it is possible to improve cooling performance of the air conditioning system through improvement of sub-cooling of the coolant.

Further, the improvement of the sub-cooling of the coolant reduces a temperature of the coolant to a required temperature and supplies the low temperature coolant to the compressor 10, so that a coefficient of performance (COP) that is a coefficient of cooling performance compared to power consumed of the compressor may be improved.

Further, the improvement of the COP may improve fuel efficiency of a vehicle when the air conditioning system is operated.

Further, space utilization may be improved by simplifying a layout of the pipe of the air conditioner compared to the pipe-type heat exchanger in the related art, and NVH performance of a vehicle may be prevented from deteriorating due to an increase of a length of the pipe.

For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A heat exchanger, comprising:
   a heat radiating part, in which a plurality of plates is stacked and a plurality of first flow paths and a plurality of second flow paths disposed while crossing each other are formed between the plurality of plates, the heat exchanging part being configured to mutually heat-exchange working fluids passing through the first and second flow paths, respectively; and
   a sub-expansion part integrally formed with an inner side of the heat radiating part, connected with the second flow path, and configured to bypass a part of one working fluid among the working fluids flowing into the heat radiating part and heat-exchange the bypassed working fluid with the working fluid passing through the first flow paths,
   wherein the sub-expansion part includes:
      at least one third flow path connected with one second flow path among the second flow paths through a connection hole; and
      an orifice fluidically connected to the third flow path and configured to continuously supply a working fluid into the third flow path through the orifice while expanding the working fluid, and
   wherein the orifice is a passage which compresses the working fluid, controls a flow of the working fluid, and Changes a pressure of the working fluid through adiabatic expansion while the working fluid passes through the orifice,
   wherein the working fluid includes:
      a high temperature and high pressure liquid coolant supplied from a condenser and partially passing through the third flow path while passing through the first flow paths; and
      a low temperature and low pressure gas coolant supplied from an evaporator and passing through the second flow paths,
   wherein the heat radiating part includes:
      a first inflow hole formed at a first side of a first surface of the heat radiating part and connected with the first flow paths;
      a first exhaust hole formed at a second side of the first surface of the heat radiating part and connected with the first flow paths;
      a second inflow hole formed at a first side of a second surface of the heat radiating part and connected with the second flow paths; and
      a second exhaust hole formed at a second side of the second surface of the heat radiating part and connected with the second flow paths, wherein a connection block is mounted on one surface of the heat radiating part, and wherein the connection block includes:
- a first connection hole formed at a first side of the connection block corresponding to the first inflow hole, and connected to the first inflow hole through a connection passage formed inside the connection block; and
- a second connection hole formed at a second side of the connection block corresponding to the second exhaust hole and connected with the second exhaust hole.

2. The heat exchanger of claim 1, wherein the first connection hole is connected with the third flow path through the orifice.

3. The heat exchanger of claim 1, wherein a lower cover is mounted on the second surface of the heat radiating part, and connection ports are integrally formed in the lower cover at locations corresponding to the first exhaust hole and the second inflow hole, respectively.

4. The heat exchanger of claim 1, wherein the third flow path is disposed between the first flow paths at a location close to the first inflow hole.

5. The heat exchanger of claim 1, wherein the heat radiating part is integrally mounted in an expansion valve.

6. The heat exchanger of claim 1, wherein the heat radiating part makes the working fluids passing through the first flow paths and the second flow paths counter-flow and mutually heat-exchanges the working fluids.

7. The heat exchanger of claim 1, wherein the heat radiating part is formed in a plate shape, in which a plurality of plates is stacked.

\* \* \* \* \*